Patented May 29, 1923.

1,456,831

UNITED STATES PATENT OFFICE.

WILLIAM H. ROSS AND WILLIAM HAZEN, OF WASHINGTON, DISTRICT OF COLUMBIA.

PROCESS FOR THE COMMERCIAL PREPARATION OF POTASSIUM PHOSPHATE.

No Drawing.   Application filed December 20, 1922.   Serial No. 608,072.

(FILED UNDER THE ACT OF MARCH 3, 1883, 22 STAT. L., 625.)

*To all whom it may concern:*

Be it known that we, WILLIAM H. ROSS and WILLIAM HAZEN, citizens of the United States of America, and employees of the Department of Agriculture of the said United States, residing at Washington, District of Columbia (whose post-office address is care of United States Department of Agriculture, Washington, D. C.), have invented a new and useful Process for the Commercial Preparation of Potassium Phosphate.

This application is made under the act of March 3, 1883, chapter 143 (22 Stat., 625), and the invention herein described and claimed may be used by the Government of the United States or any of its officers or employees in the prosecution of work for the Government or any person in the United States without the payment to us of any royalty thereon.

This invention relates to a process for preparing a product containing two of the three essential constituents of fertilizers.

The principal objects of this invention are, first, to produce a fertilizer material of such concentration that handling and transportation charges are reduced to a minimum, and, second, to bring about the elimination of chlorine from potash salts containing it and which is held to be undesirable in fertilizers for many crops.

In our joint application, Serial No. 608,073 filed Dec. 20, 1922, we have set forth a process for the preparation of a concentrated material containing all three of the essential constituents of fertilizers which involves the treatment of potassium chloride with an excess of phosphoric acid; driving off hydrochloric acid; and neutralizing the excess of acid with ammonia to form a salt which consists of a mixture of the phosphates of potassium and ammonium.

In the process herein disclosed potassium chloride is treated with phosphoric acid for the preparation of a chlorine-free material that is suited for use either in ordinary fertilizers designed for application to crops that are sensitive to chlorine, or for mixing with a salt such as ammonium phosphate for the preparation of a concentrated material containing all three of the essential constituents of fertilizers.

When potassium chloride is treated with an equivalent solution of phosphoric acid and concentrated, only a small proportion of the chlorine is replaced by the phosphoric acid. The remainder of the chlorine may be eliminated by raising the temperature to a red heat, but many mechanical difficulties attend the successful operation of the process and the residue that is obtained solidifies on cooling to a hard, glassy-like mass which is very difficult to handle.

We have found that when solid potassium chloride is treated with a solution of phosphoric acid, preferably of 70 to 90 per cent concentration and in the proportion of two gram molecules of the salt to three of the acid, complete elimination of the chlorine as hydrochloric acid may be effected at a temperature as low as 250° C. The rate at which the hydrochloric acid is given off may be greatly increased by thoroughly aerating the solution, or by forcing the solution as a fine spray into a stream of air. Aeration of the solution may be brought about by any one of several methods known in the art. A method that has been found very effective for the purpose consists in blowing air heated to about 250° C. through the porous bottom of the vessel containing the solution. Loss of material when the solution is sprayed into a current of air may be avoided by use of a Cottrell precipitator.

The hydrochloric acid given off in the process may be recovered by any of the methods well known in the art and serves as a valuable by-product.

The residue remaining after the escape of the hydrochloric acid consists of a solution of two molecules of potassium phosphate with an excess of one molecular equivalent of phosphoric acid. On diluting to a specific gravity of 1.55 to 1.65 when taken at a temperature of 60° C. and allowing to cool, the greater part of the potassium phosphate will crystallize out leaving a mother liquor which contains the excess of phosphoric acid. This mother liquor may be separated from the crystallized salt by centrifuging, and used with the addition of the proper amount of acid in the treatment of a new lot of potassium chloride. The small amount of acid remaining in the recovered salt after centrifuging may be removed if desired by any one of several well known methods that might be applied for the purpose such as countercurrent leaching with a solution saturated with respect to potassium phosphate.

While we have specified the use of three molecular equivalents of phosphoric acid to two of potassium chloride in the preferred practice of our invention it is to be understood that the proportions of these materials, the temperature conditions and other details of the procedure may be materially varied without departing from the spirit of our invention and we therefore do not desire to be limited to the above disclosure except as may be required by the claims.

What we claim is:—

1. A process for the preparation of a concentrated material containing two of the three essential constituents of fertilizers which consists in treating potassium chloride with an excess of concentrated phosphoric acid, heating the solution to drive off hydrochloric acid, diluting with water, cooling, and separating the crystallized salts from the mother liquor.

2. A process for the preparation of a concentrated material containing two of the three essential constituents of fertilizers which consists in treating two molecular equivalents of potassium chloride with three of concentrated phosphoric acid, heating the solution to drive off hydrochloric acid, diluting with water, cooling, and separating the crystallized salts from the mother liquor.

3. A process for the preparation of a concentrated material containing two of the three essential constituents of fertilizers which consists in treating potassium chloride with an excess of phosphoric acid of 70 to 90 per cent concentration, heating the solution to drive off hydrochloric acid, diluting with water, cooling, and separating the crystallized salts from the mother liquor.

4. A process for the preparation of a concentrated material containing two of the three esential constituents of fertilizers which consists in treating potassium chloride with an excess of concentrated phosphoric acid, heating the solution to a temperature of about 250° C., to drive off hydrochloric acid, diluting with water, cooling, and separating the crystallized salts from the mother liquor.

5. A process for the preparation of a concentrated material containing two of the three essential constituents of fertilizers which consists in treating potassium chloride with an excess of concentrated phosphoric acid, driving off hydrochloric acid by aerating with air at a temperature of about 250° C., diluting with water, cooling, and separating the crystallized salts from the mother liquor.

6. A process for the preparation of a concentrated material containing two of the three essential constituents of fertilizers which consists in treating potassium chloride with an excess of concentrated phosphoric acid, heating the solution to about 250° C. or above, spraying into a current of air, diluting the recovered product, cooling, and separating the crystallized salts from the mother liquor.

7. A process for the preparation of a concentrated material containing two of the three esential constituents of fertilizers which consists in treating potassium chloride with an excess of concentrated phosphoric acid, heating the solution to drive off hydrochloric acid, diluting with water to a specific gravity of about 1.60 when taken at a temperature of 60° C., cooling, and separating the crystallized salts from the mother liquor.

8. A process for the preparation of a concentrated material containing two of the three essential constituents of fertilizers which consists in treating two molecular equivalents of potassium chloride with three of concentrated phosphoric acid, and heating the solution to drive off hydrochloric acid.

WILLIAM H. ROSS.
WILLIAM HAZEN.